United States Patent [19]
Plocher et al.

[11] Patent Number: 5,598,999
[45] Date of Patent: Feb. 4, 1997

[54] DEVICE FOR HOLDING TWO DRINK CONTAINERS IN CENTRAL CONSOLE OF MOTOR VEHICLE

[75] Inventors: Bernd Plocher, Waldachtal; Juergen Koerber; Heinz Koukal, both of Sindelfingen, all of Germany

[73] Assignee: fischerwerke, Artur Fischer GmbH & Co. KG, Waldachtal, Germany

[21] Appl. No.: 517,401

[22] Filed: Aug. 21, 1995

[30] Foreign Application Priority Data

Aug. 19, 1994 [DE] Germany .................. 44 29 515.4

[51] Int. Cl.⁶ .................................................. A47K 1/08
[52] U.S. Cl. .................. 248/311.2; 224/281; 224/282; 224/926
[58] Field of Search ...................... 248/311.2, 309.1, 248/314, 315; 224/281, 282, 926; 297/188.15

[56] References Cited

U.S. PATENT DOCUMENTS

| | | | |
|---|---|---|---|
| 4,981,277 | 1/1991 | Elwell | 224/926 X |
| 5,179,447 | 1/1993 | Lain | 297/188.16 X |
| 5,379,978 | 1/1995 | Patel et al. | 224/926 X |

*Primary Examiner*—Ramon O. Ramirez
*Attorney, Agent, or Firm*—Michael J. Striker

[57] ABSTRACT

A device for holding two drink containers which can be arranged in the compartment of a central console of a motor vehicle has a holding ring for lateral fixing of the one drink container and a holding frame for the second drink container which are moved out of a position in which they are recessed in the compartment. The folded-together holding ring, together with the holding frame, assume a position projecting from the compartment. From that position, the folded-together holding ring moves into its opened-out holding position beside and above the holding frame. Movement from the recessed position can be effected automatically.

11 Claims, 8 Drawing Sheets

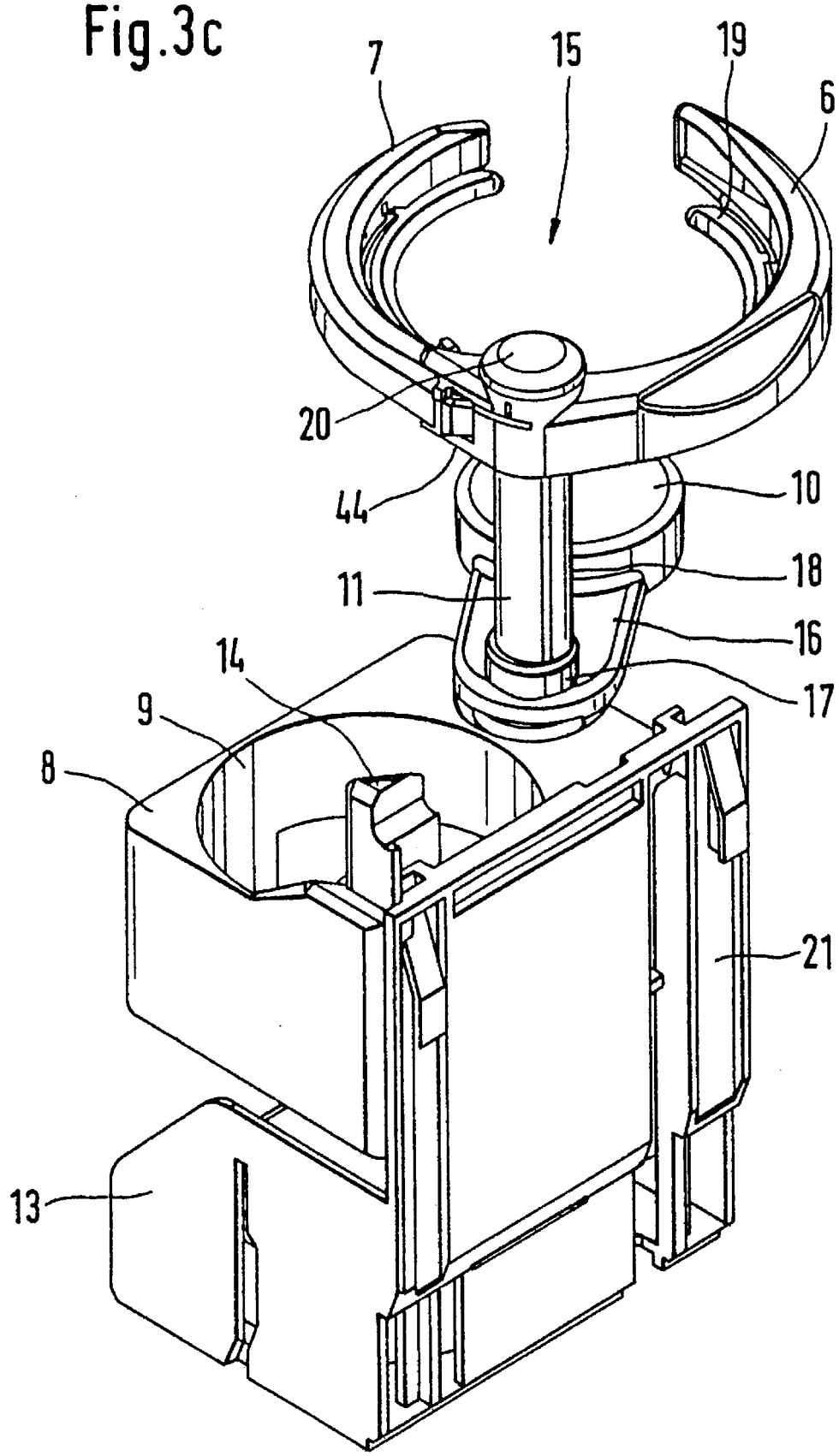

5,598,999

DEVICE FOR HOLDING TWO DRINK CONTAINERS IN CENTRAL CONSOLE OF MOTOR VEHICLE

The present invention relates to a device for holding two drink containers in a central console of a motor vehicle.

A plurality of devices for holding containers, in particular in a motor vehicle, are known. The container stands on a supporting surface which is arranged either so that it is fixed or so that it can be folded out, and a holding ring or similar means fixes the container laterally.

These known devices are unsuitable, however, for mounting in a compartment in the central console of a motor vehicle, in particular a private motor vehicle. The restricted space that is available because of the gear lever and perhaps an arm rest means that a device that can be integrated into the compartment is required.

SUMMARY OF THE INVENTION

It is therefore an object of the present invention to provide a device for holding two drink containers, which device can be recessed into the compartment when not in use and can be moved upwards out of the compartment for use.

In keeping with these objects and with others which will become apparent hereinafter, one feature of the present invention resides, briefly stated, in a device which comprises a supporting structure arranged to be inserted in a compartment of a console of a motor vehicle, and on which the holding ring and a holding frame for lateral fixing of the second drink container are held so that they are movable from a position recessed in the console to a holding position projecting from the console. The holding ring can serve therein to receive a cup and the holding frame to receive a drink can. The external dimensions of the supporting structure correspond to the dimensions of the compartment.

The device additionally comprises a fold-together ring which has a first and a second holding arm which are joined to one another by way of a vertical hinge and in the folded-together state do not exceed the external dimensions of the supporting structure and in the opened-out state are arranged beside and above the holding frame. On being folded together, the two holding arms are moved towards one another so that they lie closely against one another. Opening out can be effected by means of a suitably arranged spring element, which moves the holding arms apart until they reach their end position, defined by a stop member. It is important that the folded-together holding ring does not exceed the external dimensions of the supporting structure, so that the holding ring is able to assume the position in which it is let into the console. If required, an extra support for the container fixed laterally by the holding ring can be brought with the holding ring from the recessed position into the end position. Alternatively, it is possible to construct the holding arms so that they hold a tapered cup in such a way that the cap cannot slip through them or so that the cup stands on the console.

The holding frame with the folded-together holding ring is vertically movable from the recessed position into a position in which it projects from the console, in which the holding frame has already assumed its end position but the receiving opening of the holding frame is still covered by the holding ring. The holding ring is subsequently movable into its opened-out holding position beside and above the holding frame. The entire movement sequence can also be effected automatically by electrical, pneumatic or spring forces. By movement of the holding ring from the intermediate position into the holding position the receiving opening of the holding frame is freed so that there are then two possible ways of setting down drink containers, one drink container being fixed by the holding frame in the compartment of the console, and the other drink container being arranged laterally of the first drink container and above the console.

According to a preferred embodiment, the device has a support for the container fixed laterally by the holding ring, which support is movable together with the holding ring from the recessed position into the intermediate position and then into the holding position beneath the holding ring. For the use of the device it is thus not necessary for the console to be of level construction in the region of the holding ring in order to serve as supporting surface for the container fixed laterally by the holding ring, since it is precisely in that region that the console frequently has a slope because of the arm rest.

The movement of the holding frame with the folded-together holding ring into its end position, and the movement of the holding ring into its holding position are preferably effected automatically. Any support provided also automatically follows the movement of the holding ring. As already mentioned above, this movement can be performed pneumatically, electrically or by spring forces, so that the driver's attention is not distracted for ejecting the device from the compartment.

For manipulation and movement of the holding ring, the holding ring is mounted on a carrier element which is in the form of a vertical carrier sleeve closed at its top end; for movement from the intermediate position as far as the holding position, the sleeve is guided by means of tracking pins in external guide grooves of a rod arranged inside the carrier sleeve. When the guide grooves are of appropriate construction, the holding ring moves itself out of its position above supporting structure into a position beside and above the supporting structure and vice versa. The automatic movement is advantageously effected by means of a compression spring which is arranged inside the carrier sleeve and bears against the circumference of the rod; as it is relieved of stress, that spring effects the automatic movement of the holding ring from the intermediate position into the holding position. With this construction, by pressure on the closed end of the carrier sleeve the holding ring is brought into its recessed and folded-together position again. Pressure on the closed end also initiates the movement from the recessed position into the end position.

In a further construction the support is fixed to a bearing sleeve engaging around the carrier sleeve, which bearing sleeve is guided in a guide member arranged on the circumference of the carrier sleeve so that the support is moved into its end position by the movement of the carrier sleeve. By means of this arrangement, by appropriate construction of the guide member the support can be moved from the folded-together state of the holding ring into the end position so that the support can be positioned concentrically with respect to the holding ring.

In a further advantageous construction, between the holding frame and the carrier sleeve there is provided a locking device which only in the intermediate position releases the carrier sleeve for its movement into the holding position and subsequently locks the holding frame with respect to the supporting structure in order to keep the holding frame in the ejected position. The locking device preferably comprises a control locking member pivotally mounted on the supporting structure, which control locking member has a first control pin which is guided in a control curve in the supporting structure, and a second control pin which faces the carrier sleeve and is guided in a control recess arranged at the circumference of the carrier sleeve. By guiding the first control pin in the supporting structure, the second control pin releases the carrier sleeve for its upward movement and on upward movement of the carrier sleeve moves the first control pin into its position locking the holding frame. This solution is especially advantageous if the entire device is constructed from individual injection-molded plastic parts since these are separate, easily manufactured components.

According to a further construction, the holding frame is locked in the recessed position by way of a guide pin which runs in a cardioid curve, and the movement of the holding frame is effected by means of a tension spring secured to the supporting structure. No special electrical or pneumatic devices are therefore required and the entire device can be integrated subsequently as a simple accessory into a corresponding compartment of a console. By locking the holding frame in the recessed position in a cardioid curve (push-pull locking mechanism), the holding frame is locked in a manner known to the person skilled in the art. By pressing on the upper end of the carrier sleeve, the holding frame is unlocked and moves by virtue of the spring force into its end position. There, the above-described locking mechanism unblocks the path of the carrier sleeve in an upward direction, and the carrier sleeve, together with the support, then moves by virtue of the guide grooves automatically into the end position. To recess the holding ring and the holding frame, by continuous pressure on the top end of the carrier sleeve the holding ring is moved as far as its intermediate position, and is then moved together with the holding frame into the recessed position and locked by means of the guide pin in the cardioid curve on the supporting structure.

The overall Construction and the folding-together movement of the holding ring is improved in a further arrangement in that the holding ring has a first holding arm rigidly joined to the holder and a second holding arm arranged movably with respect to the first holding arm, which second arm is brought by means of a stop member mounted on the holding frame into its folded-together position as the holding ring is collapsed. The holding arms are expanded by means of a suitable spring element.

The device configured according to the invention therefore provides a solution for the accommodation of two containers, and the device itself can be simply and quickly recessed in the compartment of a central console. The device itself can be manufactured inexpensively from injection-molded plastic parts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3a–c show the device with the holding ring in the recessed position, the intermediate position and the holding position;

DESCRIPTION OF THE PREFERRED EMBODIMENTS

Figure 1:
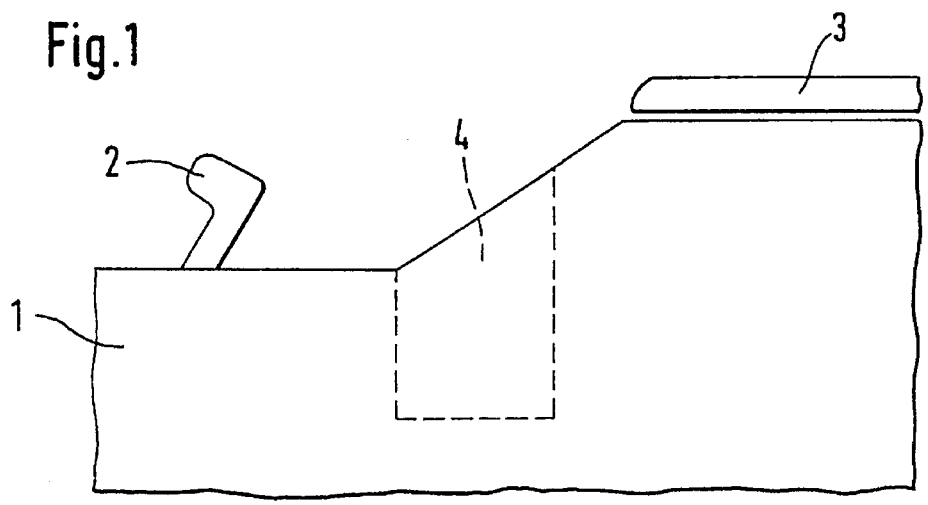
FIG. 1 is a diagrammatic side view of a central console of a private motor vehicle.

FIG. 1 is a diagrammatic side view of the central console 1 of a private motor vehicle with the gear lever 2, an arm rest 3 and between them the compartment 4 in which the device constructed according to the invention can be integrated.

Figure 2:
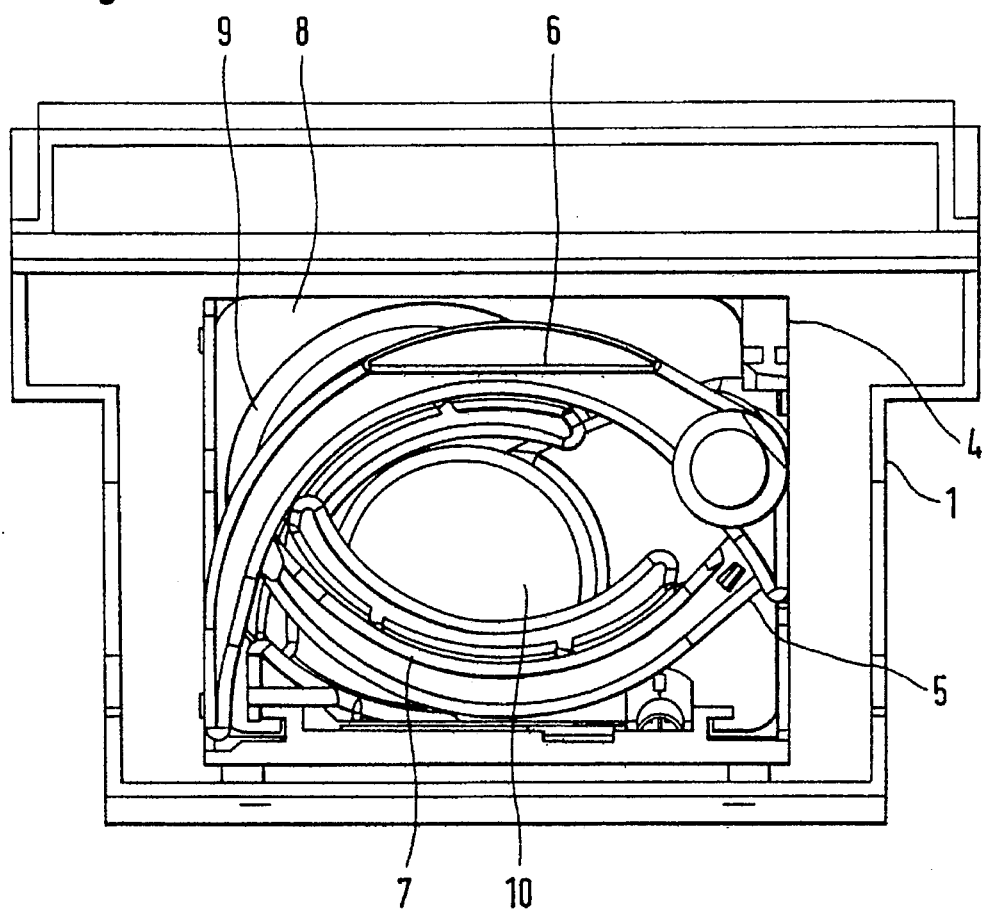
FIG. 2 is a plan view of the compartment in the central console with the recessed device.

FIG. 2 shows a diagrammatic plan view of the device 5 recessed in the compartment 4. The external dimensions of the device 5 correspond to the internal dimensions of the compartment 4 and the holding arms 6 and 7 are folded together and recessed in the compartment. FIG. 2 also shows the holding frame 8 with a recess 9 for receiving a further drink container which is partially masked by the holding arms 6 and 7 in the recessed position. An additional support 10 for the container fixed by the holding arms 6 and 7 in a lateral position can also be recessed in the compartment.

Figure 3A:
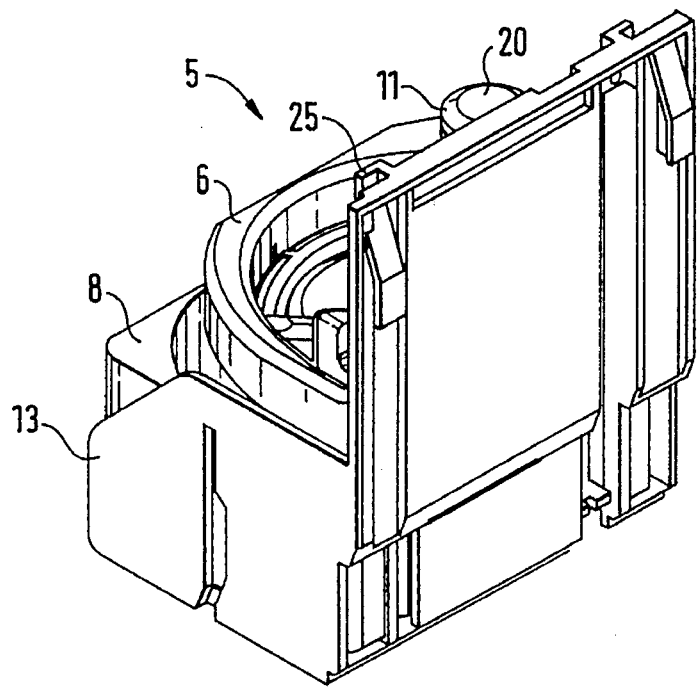
Figure 3B:
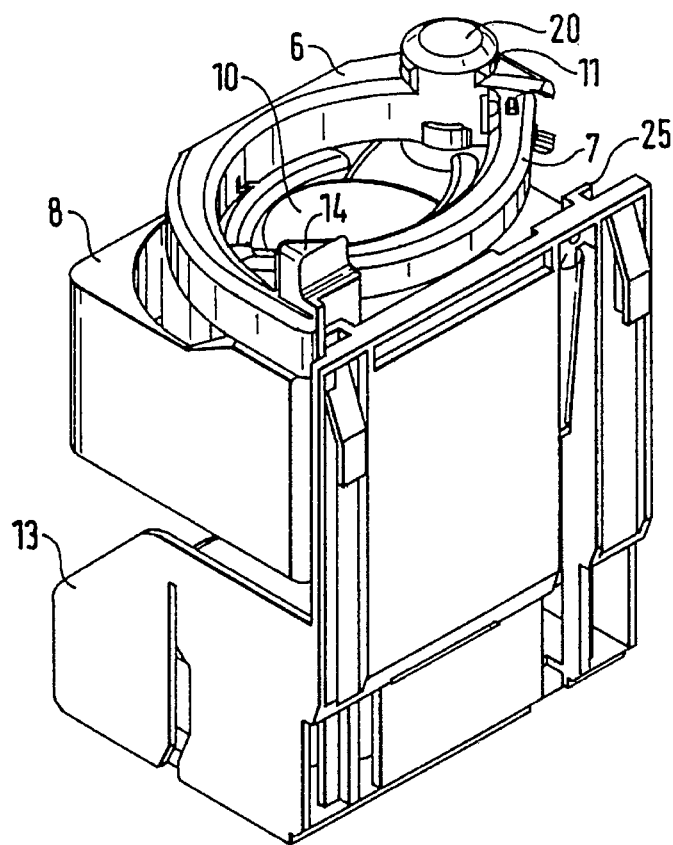

FIGS. 3a–c shows the different positions of the holding arms 6 and 7 and also of the holding frame 8. FIG. 3a shows the device 5 with the folded-together holding arms 6 and 7 and together with the holding frame 8 in the position recessed in the compartment 4, shown diagrammatically in plan view in FIG. 2. FIG. 3b shows the intermediate position in which the holding frame 8 together with the holding arms 6 and 7 and the support 10 is raised. The holding arms 6 and 7 are still folded together. As clear from FIG. 3b, the two holding arms 6 and 7 are mounted on a carrier sleeve 11, the holding arm 6 being rigidly and the holding arm 7 being movably joined to the carrier sleeve 11. The carrier sleeve 11 is joined to the holding frame 8 which is already in its end position, spaced at the appropriate distance from the bottom of the compartment in order to be able to receive a drink container. From this intermediate position the holding arms 6 and 7 and the support 10 move into the end position shown in FIG. 3c beside and above the recess 9 of the holding frame 8. The holding arm 7 movably joined to the other holding arm 6 by means of a vertical hinge is located in the opened-out position and forms with the rigid holding arm 6 a holding ring 15 for fixing a drink container, for example, a drinking cup, in a lateral position. The movement of the holding arm 7 into the holding position is effected by means of spring elements 44. The container stands on the support 10 which has also moved from its position covering the recess 9 in the intermediate position into the end position. The support 10 is secured to the carrier sleeve 11 to by way of a support arm 16 and a bearing sleeve 17 which engages around the carrier sleeve 11. By suitable configuration of a guide member 18 on the circumference of the carrier sleeve 11, the support 10 can be brought into its concentric position beneath the holding ring 15 on upward movement of the carrier sleeve 11. On the holding arms 6 and 7 of the holding ring 15 there are diameter-adapters 19 for improving the lateral hold on the drink containers when these are of different diameters. By means of an additional locking device, not visible in the Figures, the movable holding arm 7 can be moved outward as far as a locking member in order to be able to hold even relatively large drink containers, such as, for example, a thermos flask, in a lateral position.

The carrier sleeve 1 is provided with a pressure-transmitting member 20 and is connected to the holding frame 8 and the supporting structure 13 in such a manner that a brief tap on the pressure-transmitting member 20 moves the holding frame 8 together with the carrier sleeve 11 automatically from the position in FIG. 3a into the position according to FIG. 3b. With no further assistance the holding frame 8 remains in its end position and the carrier sleeve 11 moves together with the support 10 into the holding position shown in FIG. 3c, with the holding arms 6 and 7 in their opened-out position in which they form the holding ring 15. The automatic movement is effected by suitable spring elements which are arranged between the holding frame 8 and the rear wall 21 of the supporting structure 13 and inside the carrier sleeve 11. The movement of the holding arms 6 and 7 and of the holding frame 8 into the recessed position again is effected by pressing on the pressure-transmitting member 20 until the holding frame 8 locks in its recessed position on the supporting structure 13. The locking is effected by means of a guide pin guided in a cardioid curve.

Figure 4:
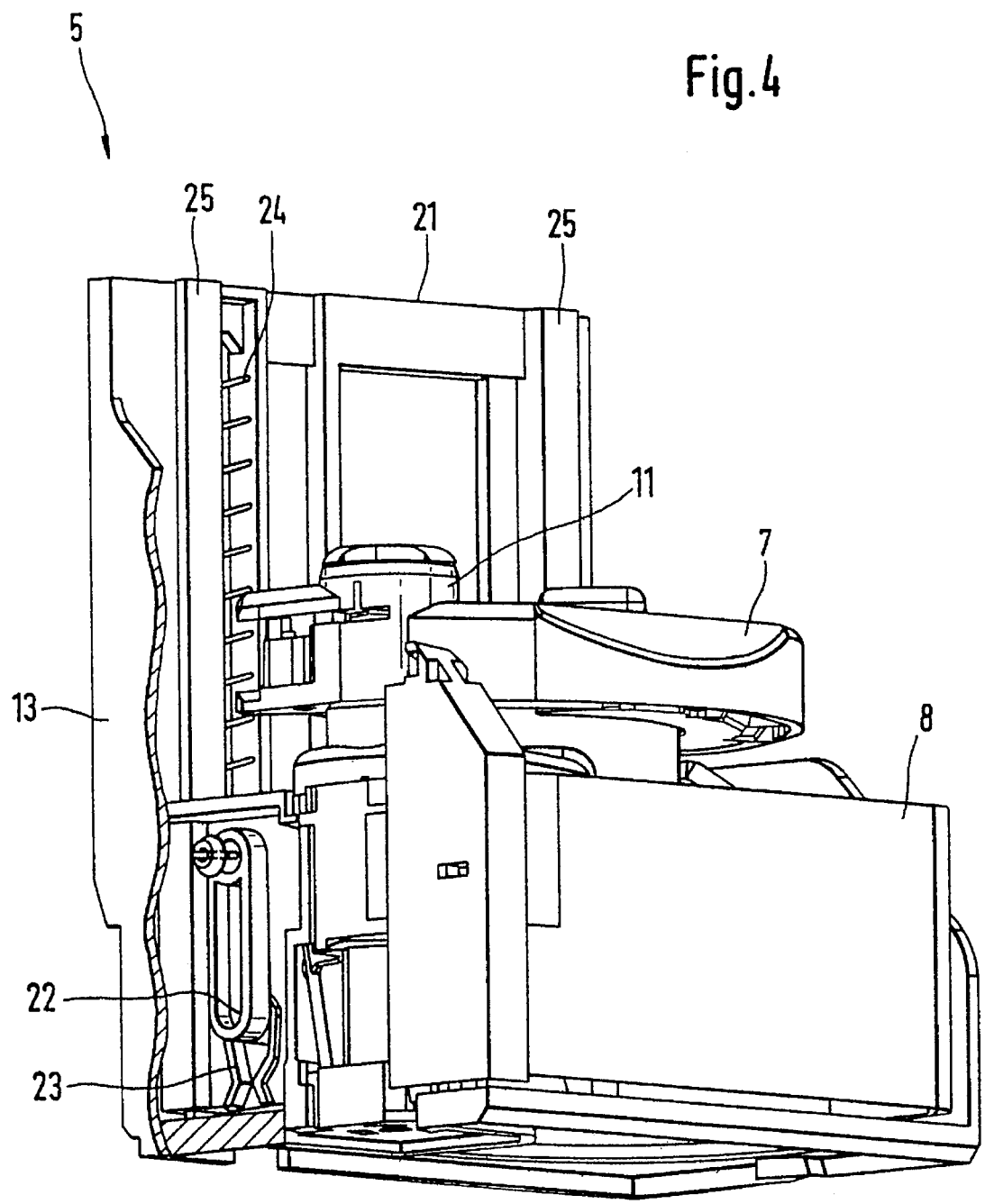
FIG. 4 is a perspective side view, broken away, of the device in the recessed position.

FIG. 4 shows the individual elements in the recessed position corresponding to FIG. 3a. FIG. 4 shows the method of locking the holding frame 8 on the supporting structure 13 by means of a suitably mounted guide pin 22 in the cardioid curve 23. By means of this locking device, which is known to the person skilled in the art, unlocking is effected by pressure on the pressure-transmitting member 20, which is transmitted by way of the carrier sleeve 11 to the holding frame 8 so that the holding frame 8 moves by the force of the tension spring 24 upwards along the guide rails 25 into the position shown in FIG. 3b. To achieve a damped movement, damping elements can be arranged between the supporting structure 13 and the holding frame 8.

Figure 5:
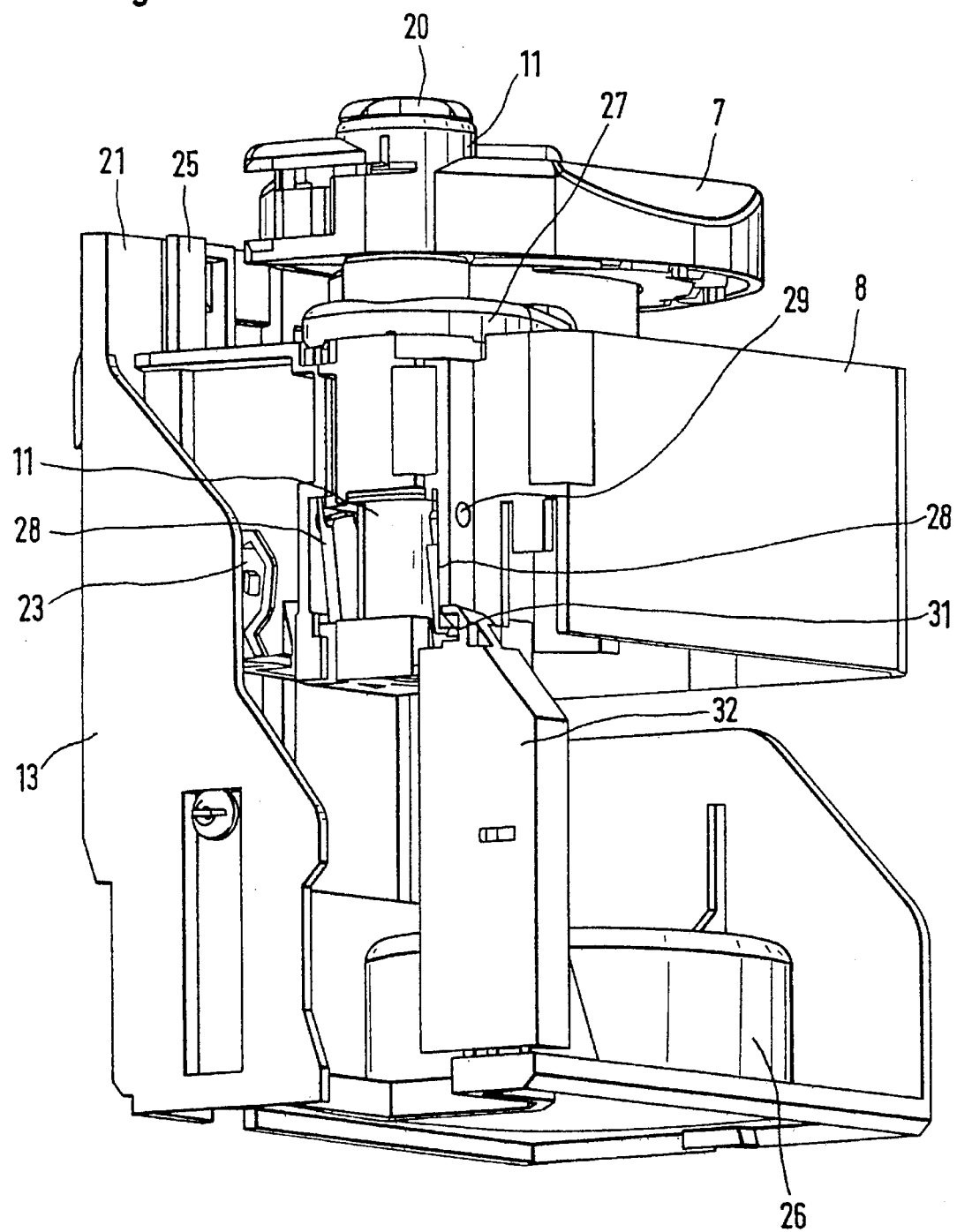
FIG. 5 is a perspective side view, broken away, of the device in the intermediate position.

The intermediate position of the device shown in FIG. 3b is illustrated in FIG. 5, in which some of the corresponding locking elements can also be seen. In the intermediate position, the cardioid curve 23, which is secured to the holding frame 8, has become detached from the corresponding guide pins on the supporting structure 13. The tension spring 24 arranged between the rear wall 21 and the holding frame 8 has moved the holding frame 8 into its end position on the supporting structure 13. By that movement the holding frame 8 has freed a standing surface 25 at the base of the supporting structure 13 for the drink container to be arranged in the holding frame 8. FIG. 5 shows the bearing sleeve 17 to which the support 10 is secured and which engages round the carrier sleeve 11. On the holding frame 8 a control locking member 28 is pivotally mounted by means of a pin 29. The control locking member 28 is of semicircular construction in this embodiment and encircles the carrier sleeve 11 on the inside. A control pin 30 which runs in a control curve 31 in the part 32 of the supporting structure 13 is secured to the control locking member 28. The control curve 31 is configured so that the movement of the carrier sleeve 11 upwards and thus the opening out of the holding ring 14, as explained in further detail hereinafter in conjunction with FIGS. 7, is initiated by the control pin 30 and a second control pin 33 (FIGS. 7).

Figure 6:
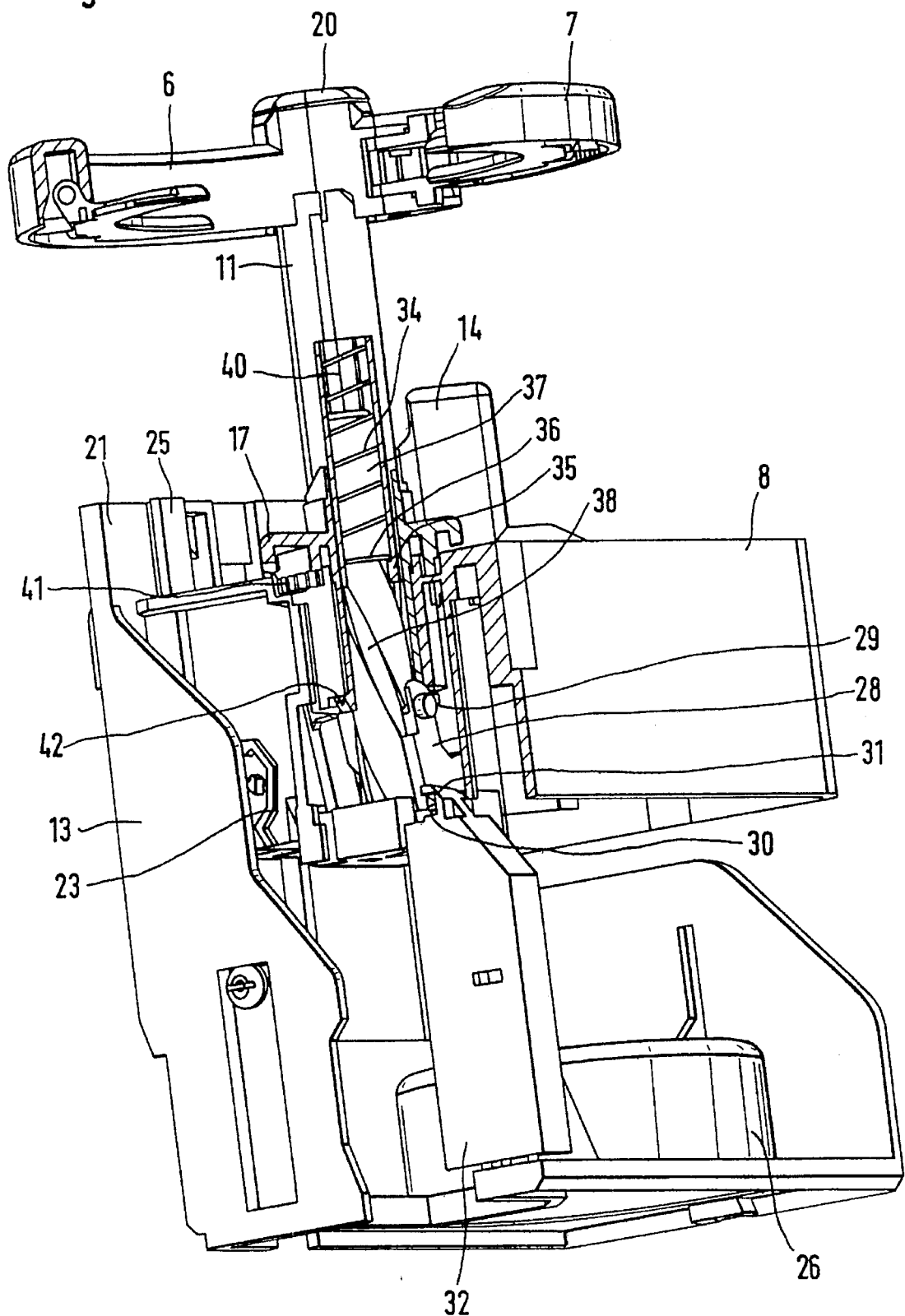
FIG. 6 is a perspective side view, broken away, of the device in the end position.

FIG. 6 shows the opened-out holding ring 15 in its end position together with the diameter adapters 19. Because the device has been partially cut away, the support 10 is not visible. FIG. 6 shows inside the carrier sleeve 11 a compression spring 34 which effects the automatic movement from the intermediate position into the end position. The compression spring 34 bears at one end against the stop member 35 inside the carrier sleeve 11 and is compressed by the shoulder 36 of the rod 37 arranged inside the carrier sleeve 11 on movement of the carrier sleeve 11 into the intermediate position. The rod 37 is connected to the holding frame 8 and has on its circumference guide grooves 38 which effect the rotary movement of the carrier sleeve 11, and thus of the holding ring 15, out of the position above the recess 9 into the lateral holding position by means of tracking pins 39 (FIGS. 7). The guidance of the pressure-transmitting member 20 inside the rod 37 is effected by way of a hexagonal pin 40 and a complementary longitudinal bore in the rod 37. The rotary movement of the carrier sleeve 11 as far as the stop member 42 can be braked by damping elements 41. In that position the control pin 30 locks the holding frame 8 at the part 32, so that the holding frame 8 is held securely in its raised position.

Figure 7B:
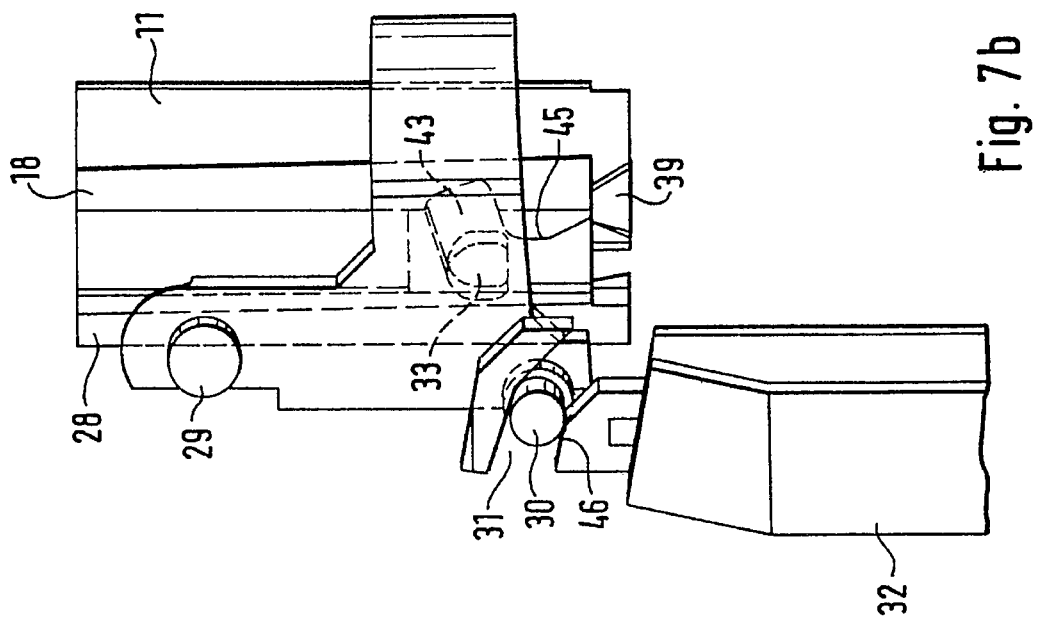
FIGS. 7a–d show the separate positions of the locking devices for the holding ring.
Figure 7A:
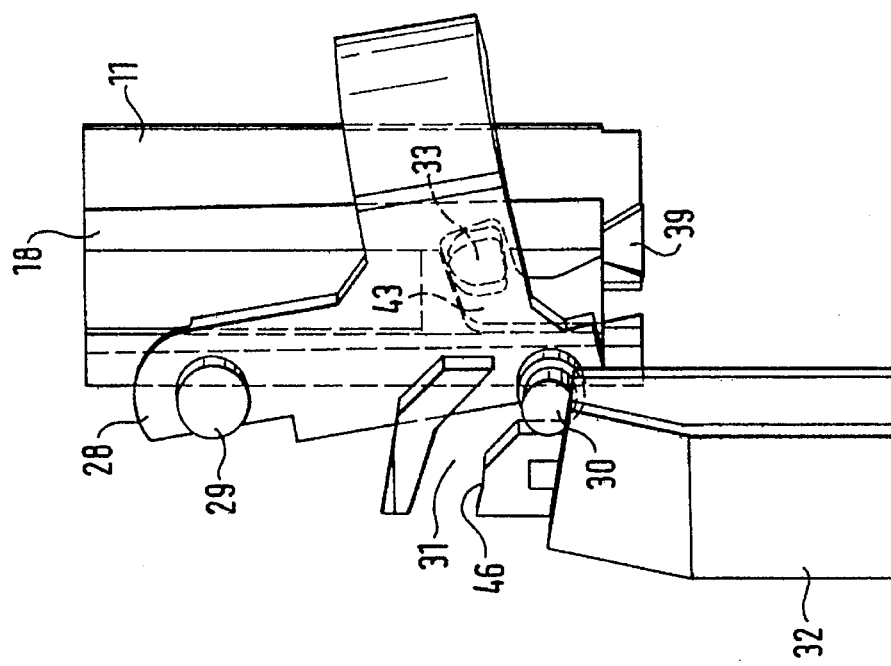
Figure 7C:
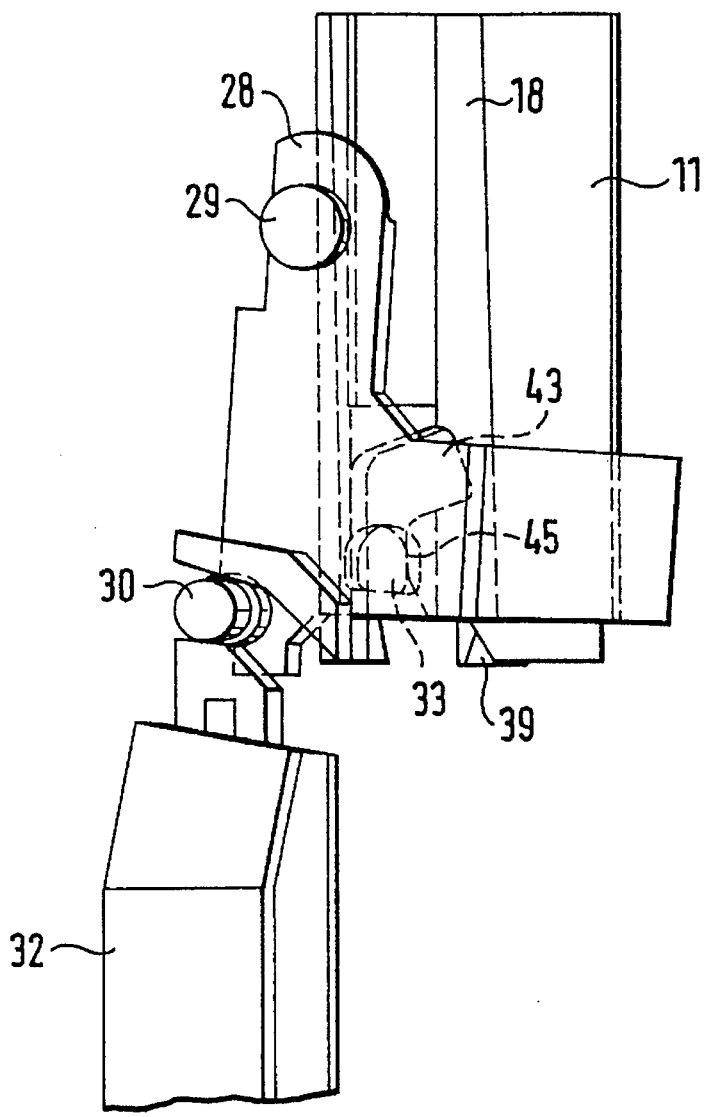

Referring to the individual illustrations in FIGS. 7, the locking and unlocking of the individual elements will be explained in more detail hereinafter. FIGS. 7a, 7b and 7c show the part 32 with the control curve 31 in which the control pin 30 of the control locking member 28 is guided. The control locking member 28, as described above, is movably mounted on the holding frame by means of the pivot pin 39. On the control locking member 28 here is the second control pin 33 which is arranged on the side of the control locking member 28 opposite the first control pin 30 and is guided in a control recess 43 on the upper side of the carrier sleeve 11. On the upper side of the carrier sleeve 11 in these Figures there is furthermore arranged a guide member 18 which effects an additional rotary movement of the bearing sleeve 27 with respect to the carrier sleeve 11. This is necessary to bring the support 10 into a concentric position with respect to the holding ring 15 and to bring the support 10 into an optimum position as the holding ring is folded together. At the lower end of the carrier sleeve 11 there are tracking pins 39 which engage in the guide grooves 38 of the rod 37 in FIG. 6.

FIG. 7a shows the control locking member 28 together with the control pins 30 and 33 and also the carrier sleeve 11 shortly before the intermediate position is reached. Until that time the control pin 30 has moved in a vertical direction along the control curve 31 and because of the shape of the control recess 43 the control pin 33 prevents the carrier sleeve 11 from moving independently of the holding frame 8. At the moment at which the holding frame reaches the end of the upward movement and thus reaches the intermediate position, the control pin 30 runs in the control curve 31 into the position illustrated in FIG. 7b. The control locking member 28 is consequently moved to the left so that the control pin 33 likewise moves to the left in the control recess 43 and thus releases the carrier sleeve 11 for movement upwards, effected by the compression spring 34. On movement of the carrier sleeve 11 upwards, the control projection 45, as shown in FIG. 7c, presses the control pin 33 further to the left so that the control pin 30 in the control curve 31 reaches the substantially horizonal region 46 of the control curve 31. The holding frame 8 is then locked by way of the control locking member and the pivot pin 29 against downward movement. The movement of the control pin 33 for locking the holding frame is further reinforced by rotary movement of the carrier sleeve 11 already initiated by virtue of the tracking pins 39 guided in the guide grooves 38. This is shown in FIG. 7c of the basis of the other perspective of the tracking pins 39 and the enlarged distance between the lower end of the carrier sleeve 11 and the part 32.

Figure 7D:
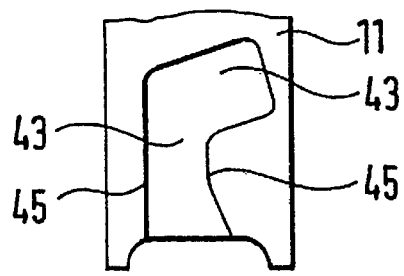

In FIG. 7d the control recess 43 on the top side of the carrier sleeve 11 is shown once again on its own. On downward movement of the carrier sleeve 11 the edge 47, together with the rotary movement of the carrier sleeve 11 caused by the guide grooves 38, causes the control pin 30 to be moved by way of the control pin 33 out of the horizontal region 46 of the control curve 31, thus releasing the holding frame for a movement downwards. By further pressure on the end face 20 of the carrier sleeve 11, the control pin 33 reaches the region 48 of the control recess 43, whereupon the carrier sleeve 11 is locked with the holding frame and by pressure on the carrier sleeve 11 is moved downwards into the recessed position.

The individual elements of the device are manufactured from injection-molded plastic parts, which allows an inexpensive manufacture of the device.

It will be understood that each of the elements described above, or two or more together, may also find a useful application in other types of constructions differing from the types described above.

While the invention has been illustrated and described as embodied in a device for holding two drink containers in a central console of motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for holding two drink containers, comprising a supporting structure insertable into a compartment of a console of a motor vehicle; a holding ring and a holding frame having a receiving opening provided for lateral fixing of a second drink container and movable from a recessed position in which they are recessed in the console and a holding position projecting from the console; a carrier element, said holding ring being formed as a folded-together ring and mounted on said carrier element, said holding ring including a first holding arm and a second holding arm horizontally turnable relative to one another between a folded-together state in which said arms do not exceed external dimensions of said supporting structure and an open-out state in which said arms are arranged besides and above said holding frame, said holding frame with said holding ring in said folded-together state being movable from said recessed position into an end position projecting from the console, in which said receiving opening of said holding frame is initially still masked by said holding arms of said holding ring still in an intermediate position, and subsequently said holding ring is opened-out into said opened-out holding position besides and above said holding frame.

2. A device as defined in claim 1; and further comprising a vertical hinge which joins said first holding arm and said second holding arm with one another.

3. A device as defined in claim 1; and further comprising a support provided for supporting a container laterally fixed by said holding ring, said support together with said holding ring being movable from said recessed position into the intermediate position and subsequently into said holding position beneath said holding ring.

4. A device as defined in claim 1, wherein said holding frame and said holding ring are formed so that a movement of said holding frame with said holding ring in said folded-together position into said end position and the subsequent movement of said holding ring into said holding position are performed automatically.

5. A device as defined in claim 1, wherein said carrier element provided for said holding ring is formed as a vertically arranged carrier sleeve closed at a top end; and further comprising a rod arranged inside said carrier sleeve and provided with external guide grooves; and tracking pins arranged so that said carrier sleeve is guided by said tracking pins in said external guide grooves of said rod for movement from said intermediate position to said holding position.

6. A device as defined in claim 4; and further comprising a bearing sleeve element for said engaging around said carrier sleeve and securing said support; and further comprising a guide member provided on a circumference of said carrier sleeve so that said support moves into its end position by movement of said carrier sleeve.

7. A device as defined in claim 5; and further comprising a compression spring arranged inside said carrier sleeve and bearing against a circumference of said rod, and on being relieved of stress effects providing an automatic movement of said holding ring from said intermediate position to said holding position.

8. A device as defined in claim 1, wherein said carrier element of said holding ring is formed as a vertically arranged carrier sleeve closed at a top end; and further comprising a locking mechanism provided between said supporting structure and said carrier sleeve and in an intermediate position first releasing said carrier sleeve for its movement into said holding position and subsequently locking said holding frame with respect to said supporting structure in order to hold said holding frame in its extended position.

9. A device as defined in claim 8, wherein said supporting structure has a control curve and said carrier sleeve has a circumference provided with a control recess, said locking mechanism including a control locking member pivotably mounted on said holding frame and having a first control pin which is guided in said control curve of said supporting structure and a second control pin which faces said carrier sleeve and is guided in said control recess at said circumference of said carrier sleeve, so that by guiding said first control pin in said supporting structure, the second control pin releases said carrier sleeve from its upward movement, and on upward movement of said carrier sleeve said second control pin moves said first control pin into a position locking said holding frame.

10. A device as defined in claim 1; and further comprising means forming a cardioid curve; a guide pin running in said cardioid curve and locking said holding frame in said recessed position; and a tension spring secured to said supporting structure and arranged so that a movement of said holding frame to its end position is effected by said tension spring.

11. A device as defined in claim 1, wherein said carrier element is formed as a vertically arranged carrier sleeve closed at a top end, said holding ring having a first holding arm rigidly joined to said carrier sleeve and a second holding arm arranged movably with respect to said holding arm; and further comprising a stop member mounted on said holding frame and arranged so that said second holding arm is brought by said stop member into a folded-together position when said holding ring is folded-together.

* * * * *